(12) United States Patent
Maeda (10) Patent No.: US 9,872,090 B2
(45) Date of Patent: Jan. 16, 2018

(54) WAVELENGTH REDUNDANCY DEVICE AND WAVELENGTH REDUNDANCY METHOD

(71) Applicant: MITSUBISHI ELECTRIC CORPORATION, Chiyoda-ku (JP)

(72) Inventor: Kenichi Maeda, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/117,006

(22) PCT Filed: Jan. 6, 2015

(86) PCT No.: PCT/JP2015/050150
§ 371 (c)(1),
(2) Date: Aug. 5, 2016

(87) PCT Pub. No.: WO2015/129290
PCT Pub. Date: Sep. 3, 2015

(65) Prior Publication Data
US 2017/0180834 A1 Jun. 22, 2017

(30) Foreign Application Priority Data

Feb. 25, 2014 (JP) .................................. 2014-034155

(51) Int. Cl.
*H04J 14/00* (2006.01)
*H04Q 11/00* (2006.01)
*H04J 14/02* (2006.01)

(52) U.S. Cl.
CPC ...... *H04Q 11/0066* (2013.01); *H04J 14/0297* (2013.01); *H04Q 2011/0016* (2013.01); *H04Q 2011/0081* (2013.01)

(58) Field of Classification Search
CPC ....... H04Q 11/0066; H04Q 2011/0016; H04Q 2011/0081; H04J 14/0297
(Continued)

(56) References Cited

U.S. PATENT DOCUMENTS 8,731,398 B2   5/2014  Akiyama et al.
2011/0158648 A1   6/2011  Kubo et al.
(Continued)

FOREIGN PATENT DOCUMENTS

EP   2 405 596 A1   1/2012
JP   2012-195782 A   10/2012
(Continued)

OTHER PUBLICATIONS

International Search Report dated Feb. 10, 2015 in PCT/JP2015/050150 filed Jan. 6, 2015.
(Continued)

*Primary Examiner* — M. R. Sedighian
(74) *Attorney, Agent, or Firm* — Oblon, McClelland, Maier & Neustadt, L.L.P.

(57) ABSTRACT

10-Gbps client signals (1a) to (1c) which are processed by a 10-Gbps transponder (3a), a 40-Gbps transponder (3b), and a 100-Gbps transponder (3c), respectively, are branched by optical couplers (2a) to (2c) into an M:N switch (40). The M:N switch (40) selects a client signal to be made redundant from the branched client signals (1a) to (1c) and outputs the selected client signal to a redundancy 100-Gbps transponder (50) having 10-Gbps-based client interfaces.

3 Claims, 9 Drawing Sheets

(58) Field of Classification Search
USPC .......................................................... 398/49
See application file for complete search history.

(56) References Cited

U.S. PATENT DOCUMENTS

2012/0237199 A1* 9/2012 Akiyama .................. H04J 3/14
                                                                                                       398/2
2013/0195440 A1    8/2013 Tominaga

FOREIGN PATENT DOCUMENTS

| JP | 2013-126193 A | 6/2013 |
|---|---|---|
| WO | 2010-044154 A1 | 4/2010 |
| WO | 2012/073419 A1 | 6/2012 |

OTHER PUBLICATIONS

Extended European Search Report dated Aug. 29, 2017 in European Patent Application No. 15754773.8.

* cited by examiner

WAVELENGTH REDUNDANCY DEVICE AND WAVELENGTH REDUNDANCY METHOD

FIELD OF THE INVENTION

The invention relates to a wavelength redundancy device in a wavelength multiplexing optical transmission system and a wavelength redundancy method.

BACKGROUND OF THE INVENTION

For implementation of high-capacity optical transmission, only increasing the number of multiplexed wavelengths and constructing new optical fiber networks do not sufficiently meet demand. Thus, in recent years, rapid development has proceeded in transmission rate per transponder from conventional 10 Gbps to 40 Gbps, 100 Gbps, and 400 Gbps. For a method of increasing the channel capacity of a submarine cable, an upgrade scheme is common, in which a conventional optical fiber is used and a part of a 10 Gbps band in use is freed up by being taken up by new 40 Gbps and 100 Gbps by migration and is effectively used, or a band that is available in the first place is effectively used.

Due to such technical trends, a wavelength multiplexing optical transmission system including transponders having different transmission rates has been increasing in recent years.

Meanwhile, the wavelength multiplexing optical transmission system has a system configuration in which when trouble has occurred in a certain single wavelength, in order to protect client signals which are transmitted carried on the wavelength, a redundancy system is provided so that switchover between the redundancy system and a working system can be performed.

For example, Patent reference 1 describes an optical redundant switching device (wavelength redundancy device) including optical couplers 11-1 to 11-n that branch signals of n channels received from external devices into two directions for working systems and for a protection system for each channel; transponders 12-1 to 12-n that convert the signals for the working systems which are branched by the optical couplers 11-1 to 11-n into optical signals with $\lambda_1$ to $\lambda_n$, and send out the optical signals; an optical switch 13 that selects a protection system signal from the signals for the protection system which are branched by the optical couplers 11-1 to 11-n, and sends out the selected protection system signal; and a transponder 12-($n$+1) that converts the protection system signal sent out from the optical switch 13 into an optical signal with $\lambda_{n+1}$ and sends output the optical signal (see FIG. 1 of Patent reference 1).

When a failure is detected in one wavelength among the optical signals with $\lambda_1$ to $\lambda_n$ sent out from the transponders 12-1 to 12-n, the optical switch 13 selects a signal for the protection system corresponding to a signal carried on the wavelength where the failure is detected, and outputs the signal for the protection system to the transponder 12-($n$+1). The transponder 12-($n$+1) transmits the outputted signal using $\lambda_{n+1}$ (see FIG. 4 of Patent reference 1).

RELATED ART DOCUMENT

Patent Reference

Patent reference 1: International Application Publication No. WO 2010/044154.

SUMMARY OF THE INVENTION

Problems to be Solved by the Invention

However, in a wavelength redundancy device such as that described above, if, for example, assuming that the transponder 12-1 is a 10-Gbps transponder, the transponder 12-2 is a 40-Gbps transponder, and the transponder 12-3 is a 100-Gbps transponder, that is, if a wavelength multiplexing optical transmission system having different WDM (Wavelength Division Multiplex) transmission rates such as 100 Gbps, 40 Gbps, and 10 Gbps is applied, there is a need to install a wavelength redundancy device (the optical couplers 11-1 to 11-n, the optical switch 13, the transponder 12-($n$+1) and other components) on a per WDM transmission rate basis. Hence, there is a problem that a band needs to be reserved for a plurality of transponders installed for redundancy, the cost and installation space required for wavelength redundancy devices, and the like, increase.

The invention is made to solve problems such as that described above, and an object of the invention is to obtain a wavelength redundancy device that does not need to be installed on a per WDM transmission rate basis in a wavelength multiplexing optical transmission system having different WDM transmission rates.

Means for Solving the Problem

A wavelength redundancy device according to one aspect of the invention is a wavelength redundancy device in a wavelength multiplexing optical transmission system in which WDM line signals of different wavelengths are outputted from a plurality of working transponders that process inputted client signals, and there are a plurality of types of transmission rates of the WDM line signals, the wavelength redundancy device including: optical couplers that output the client signals to the working transponders, and output redundancy client signals into which the client signals are branched; a transponder for redundancy that includes a client interface, and processes a signal inputted through the client interface and outputs the processed signal as a redundancy WDM line signal; and a selector/switcher that receives as input the redundancy client signals outputted from the optical couplers, and selectively outputs a signal with a transmission rate conforming to the client interface of the transponder for redundancy, wherein when trouble has occurred in any of the wavelengths of the WDM line signals outputted from the working transponders, the selector/switcher selects the redundancy client signal of the client signal inputted to the working transponder that outputs the WDM line signal of the wavelength where the trouble has occurred, and outputs the selected redundancy client signal as a redundancy client signal with the transmission rate conforming to the client interface of the transponder for redundancy, and the transponder for redundancy processes the redundancy client signal with the transmission rate conforming to the client interface outputted from the selector/switcher, and outputs the processed redundancy client signal as the redundancy WDM line signal.

In addition, a wavelength redundancy method according to another aspect of the invention is a wavelength redundancy method for a wavelength redundancy device in a wavelength multiplexing optical transmission system in which WDM line signals of different wavelengths are outputted from a plurality of working transponders that process inputted client signals, and there are a plurality of types of transmission rates of the WDM line signals, the wavelength redundancy device including: optical couplers that output the client signals to the working transponders, and output redundancy client signals into which the client signals are branched; a transponder for redundancy that includes a client interface, and processes a signal inputted through the client interface and outputs the processed signal as a redundancy WDM line signal; and a selector/switcher that receives as input the redundancy client signals outputted from the optical couplers, and selectively outputs a signal with a transmission rate conforming to the client interface of the transponder for redundancy, the wavelength redundancy method including: a signal selecting step of selecting, when trouble has occurred in any of the wavelengths of the WDM line signals outputted from the working transponders, the redundancy client signal of the client signal inputted to the working transponder that outputs the WDM line signal of the wavelength where the trouble has occurred, the signal selecting step being performed by the selector/switcher; a first signal outputting step of outputting the redundancy client signal selected in the signal selecting step, as a redundancy client signal with the transmission rate conforming to the client interface of the transponder for redundancy, the first signal outputting step being performed by the selector/switcher; and a second signal outputting step of processing the redundancy client signal with the transmission rate conforming to the client interface outputted in the first signal outputting step, and outputting the processed redundancy client signal as the redundancy WDM line signal, the second signal outputting step being performed by the transponder for redundancy.

Advantageous Effects of the Invention

According to the invention, there is no need to install a wavelength redundancy device on a per WDM transmission rate basis, enabling effective use of a band and a reduction in the cost and installation space required for wavelength redundancy devices.

EMBODIMENTS OF THE INVENTION

To describe the invention in more detail, embodiments of the invention will be described below with reference to the accompanying drawings.

First Embodiment

Figure 1:
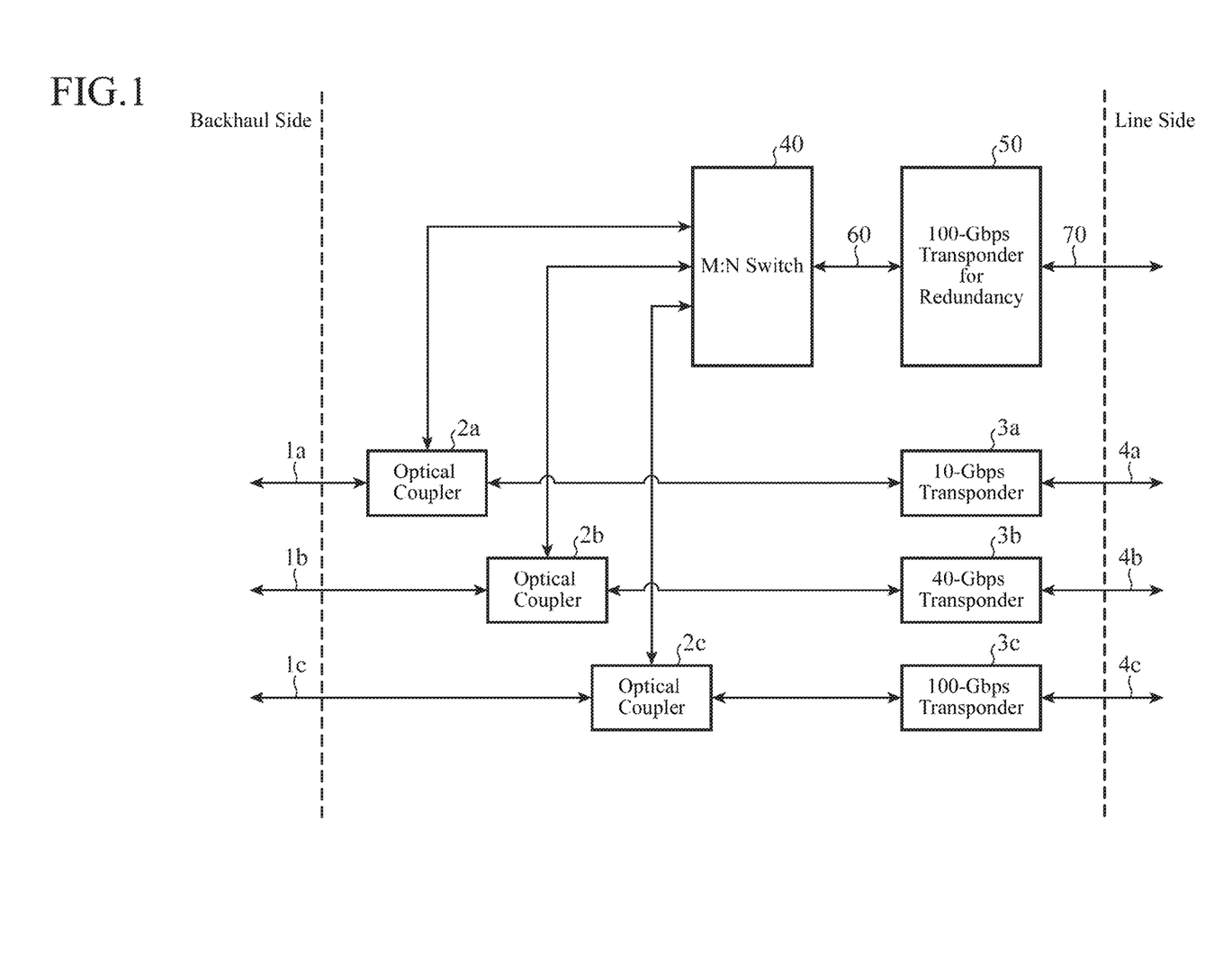
FIG. 1 is a diagram showing a configuration of a terminal device including a wavelength redundancy device according to a first embodiment of the invention.

FIG. 1 shows an exemplary configuration of a terminal device including a wavelength redundancy device according to a first embodiment of the invention.

The terminal device includes optical couplers 2a to 2c that branch client signals 1a to 1c which are transmitted from a backhaul side; a 10-Gbps transponder 3a (working transponder) including one 10-Gbps-based client interface; a 40-Gbps transponder 3b (working transponder) including four 10-Gbps-based client interfaces; a 100-Gbps transponder 3c (working transponder) including ten 10-Gbps-based client interfaces; an M:N switch 40 (selector/switcher) that selectively outputs inputted signals; and a 100-Gbps transponder 50 for redundancy including ten 10-Gbps-based client interfaces. Note that FIG. 1 only shows components related to redundancy and omits components that perform processes such as wavelength multiplexing and amplification.

The client signal 1a is one 10-Gbps signal to be transmitted to the 10-Gbps transponder 3a. The client signals 1b are 10-Gbps signals and are to be transmitted to the 40-Gbps transponder 3b, and four client signals 1b are transmitted. The client signals 1c are 10-Gbps signals and are to be transmitted to the 100-Gbps transponder 3c, and ten client signals 1c are transmitted.

The client signal 1a is branched by the optical coupler 2a into a direction of the 10-Gbps transponder 3a and a direction of the M:N switch 40. Likewise, the client signals 1b are branched by the optical coupler 2b into a direction of the 40-Gbps transponder 3b and the direction of the M:N switch 40. The client signals 1c are branched by the optical coupler 2c into a direction of the 100-Gbps transponder 3c and the direction of the M:N switch 40.

Of the client signals 1a to 1c which are branched into two directions by the optical couplers 2a to 2c, signals going to the M:N switch 40 are branched as redundancy client signals. Note that both of signals going to the M:N switch 40 and signals going to the 10-Gbps transponder 3a, the 40-Gbps transponder 3b, or the 100-Gbps transponder 3c are substantially the same signals, and thus, description is made such that both signals are referred to as the client signals 1a to 1c.

The 10-Gbps transponder 3a outputs the client signal 1a inputted through the optical coupler 2a, to a line side at a wavelength $\lambda_1$, as a 10-Gbps WDM line signal 4a. In addition, the 40-Gbps transponder 3b bundles together and outputs the client signals 1b inputted through the optical coupler 2b, to the line side at a wavelength $\lambda_2$, as a 40-Gbps WDM line signal 4b. In addition, the 100-Gbps transponder 3c bundles together and outputs the inputted client signals 1c to the line side at a wavelength $\lambda_3$, as a 100-Gbps WDM line signal 4c.

That is, FIG. 1 shows that there are different transmission rates of the WDM line signals (WDM transmission rates) and the client signals have the same transmission rate.

The M:N switch 40 includes 15 10-Gbps-based client interfaces, and selectively outputs, as redundancy client signals 60, 10 client signals 1a to 1c at the maximum which are inputted through the optical couplers 2a to 2c. That is, the M:N switch 40 is a 15:10 switch.

The 100-Gbps transponder 50 for redundancy bundles together and outputs the redundancy client signals 60 which are inputted from the M:N switch 40 through its client interfaces, to the line side at a wavelength $\lambda_4$, as a 100-Gbps redundancy WDM line signal 70.

Next, the operation of the terminal device configured in the above-described manner will be described.

At normal times, the 10-Gbps transponder 3a outputs a client signal 1a inputted through the optical coupler 2a, to the line side at the wavelength $\lambda_1$, as a 10-Gbps WDM line signal 4a. Likewise, the 40-Gbps transponder 3b outputs client signals 1b inputted through the optical coupler 2b, to the line side at the wavelength $\lambda_2$, as a 40-Gbps WDM line signal 4b, and the 100-Gbps transponder 3c outputs client signals 1c inputted through the optical coupler 2c, to the line side at the wavelength $\lambda_3$, as a 100-Gbps WDM line signal 4c. Then, the WDM line signals are subjected to processes such as wavelength multiplexing and amplification, and outputted to an optical transmission line.

Note that the above-described flow of operation is a flow for when the terminal device shown in FIG. 1 functions as a transmitting side, and when the flow goes backward, the terminal device shown in FIG. 1 functions as a receiving side. A wavelength multiplexing optical transmission system is constructed such that a plurality of terminal devices face each other.

Next, operation performed when trouble has occurred in a wavelength, i.e., a redundancy process, will be described.

For example, it is assumed that some kind of trouble has occurred in a path related to the wavelength $\lambda_1$ of the 10-Gbps WDM line signal 4a which is outputted from the 10-Gbps transponder 3a.

The trouble may be, for example, detected and notified by another terminal device facing the terminal device. Alternatively, the trouble may be detected by, for example, a device (not shown) that manages the entire wavelength multiplexing optical transmission system including the terminal device, and notified to the terminal device.

In response to the notification about the trouble concerning the wavelength $\lambda_1$, the 10-Gbps transponder 3a stops the client signal 1a inputted through the optical coupler 2a, by a controller (not shown) included therein, using software or hardware.

In addition, in response to the notification about the trouble concerning the wavelength $\lambda_1$, a switch controller (included in the M:N switch 40; not shown) controls the switching of the switch of the M:N switch 40.

Figure 2:
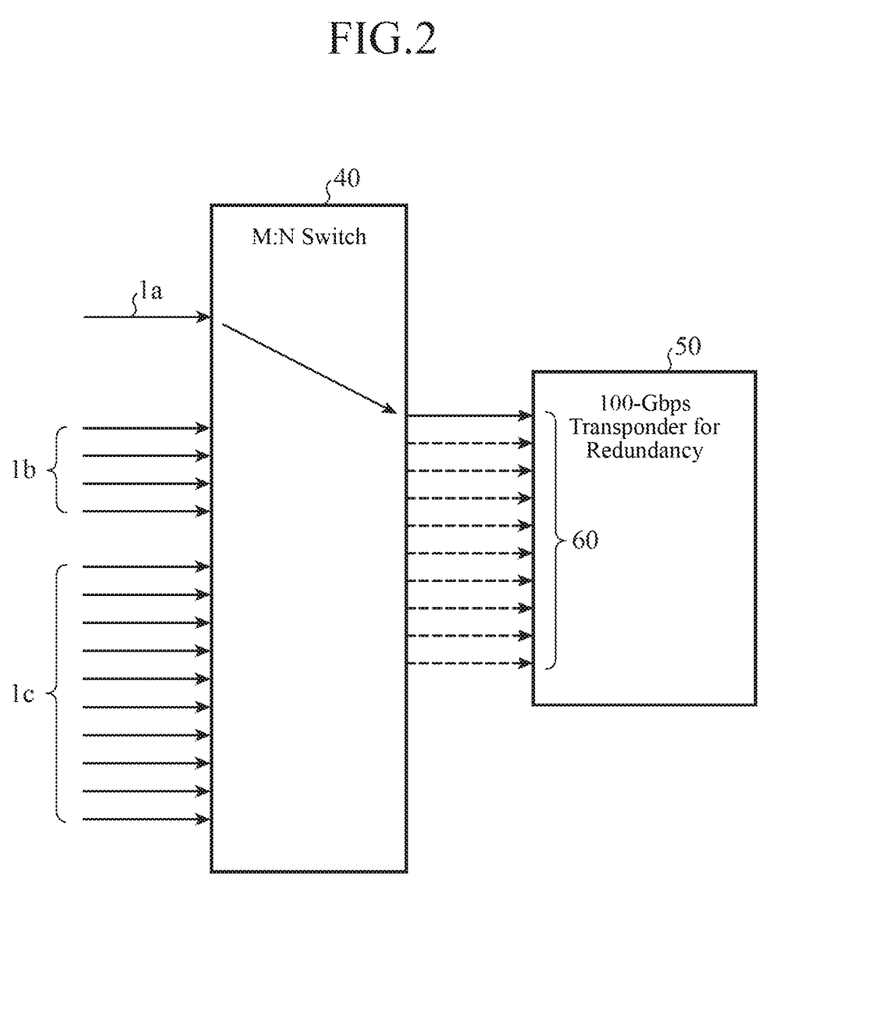
FIG. 2 is a diagram showing the flow of a signal in an M:N switch of the wavelength redundancy device according to the first embodiment of the invention for when one wavelength is made redundant.

By the control of the switch controller, the M:N switch 40 selects the client signal 1a from the client signals 1a to 1c inputted through the optical couplers 2a to 2c, and outputs the client signal 1a as a redundancy client signal 60. At this time, the switch is switched so as to be connected to a port (client interface) with the smallest number of the 100-Gbps transponder 50 for redundancy. The flow of a signal in the M:N switch 40 at this time is shown in FIG. 2.

The 100-Gbps transponder 50 for redundancy outputs the redundancy client signal 60 (actually, the client signal 1a) which is inputted from the M:N switch 40, to the line side at the wavelength $\lambda_4$, as a 100-Gbps redundancy WDM line signal 70. In this manner, redundancy of the wavelength $\lambda_1$ is achieved.

Figure 3:
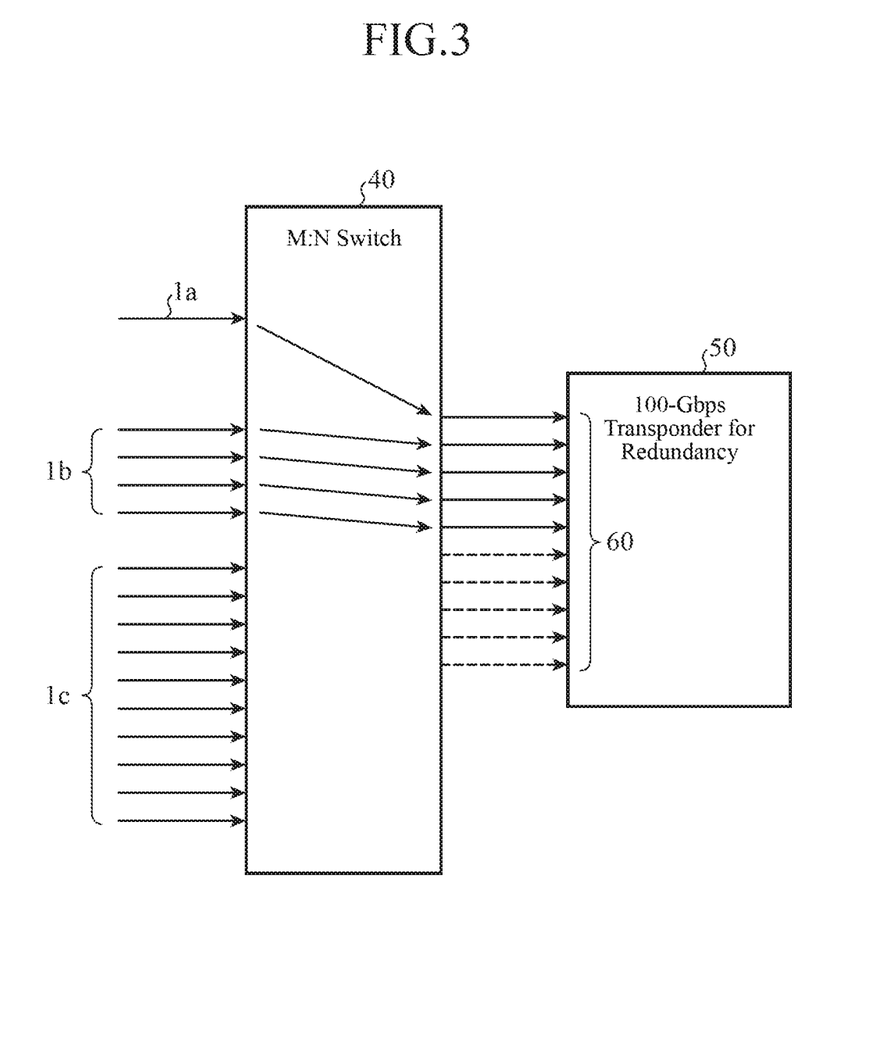
FIG. 3 is a diagram showing the flows of signals 1n the M:N switch of the wavelength redundancy device according to the first embodiment of the invention for when a plurality of wavelengths are made redundant.

When, in addition to the wavelength $\lambda_1$, some kind of trouble has further occurred in a path related to the wavelength $\lambda_2$ for 40-Gbps, the M:N switch 40 connects the client signals 1b inputted through the optical coupler 2b, to ports with the smallest numbers among the ports of the 100-Gbps transponder 50 for redundancy that are not yet occupied. The flows of signals in the M:N switch 40 at this time are shown in FIG. 3. FIG. 3 also shows the flows of signals in the M:N switch 40 for when trouble concerning the wavelength $\lambda_1$ and the wavelength $\lambda_2$ has occurred simultaneously.

The 100-Gbps transponder 50 for redundancy outputs the redundancy client signals 60 (actually, the client signal 1a and the client signals 1b) which are inputted from the M:N switch 40, to the line side at the wavelength $\lambda_4$, as a 100-Gbps redundancy WDM line signal 70. In this manner, the plurality of wavelengths $\lambda_1$ and $\lambda_2$ can be made redundant simultaneously.

Note that when some kind of trouble has occurred in a path related to the wavelength $\lambda_3$ for 100-Gbps, too, the same redundancy process as that performed for the above-described wavelengths $\lambda_1$ and $\lambda_2$ is performed.

As such, when trouble concerning the wavelengths $\lambda_1$ to $\lambda_3$ of the WDM line signals 4a to 4c which are outputted from the 10-Gbps transponder 3a, the 40-Gbps transponder 3b, and the 100-Gbps transponder 3c has occurred, client signals carried on the wavelengths where the trouble has occurred are outputted as a redundancy WDM line signal 70 from the 100-Gbps transponder 50 for redundancy.

That is, the 10-Gbps transponder 3a, the 40-Gbps transponder 3b, and the 100-Gbps transponder 3c serve as working systems, and the 100-Gbps transponder 50 for redundancy serves as a redundancy system.

The optical couplers 2a to 2c, the M:N switch 40, and the 100-Gbps transponder 50 for redundancy compose a wavelength redundancy device, and even if there are different WDM transmission rates such as 10 Gbps, 40 Gbps, and 100 Gbps, it is sufficient to provide only the 100-Gbps transponder 50 for redundancy as a transponder installed for redundancy, and for a band reserved for redundancy, too, it is sufficient to reserve only a band for the 100-Gbps transponder 50 for redundancy. Therefore, effective use of a band is possible over the case of installing a wavelength redundancy device on a per WDM transmission rate basis. In addition, since there is no need to install a wavelength redundancy device on a per WDM transmission rate basis, a reduction in the cost and installation space required for wavelength redundancy devices is possible.

Note that, for a client signal having been switched to an output from the 100-Gbps transponder 50 for redundancy to the line side due to the occurrence of trouble, when the trouble is solved and the client signal is brought back again to an output from the working system to the line side, if connections from the M:N switch 40 to ports of the 100-Gbps transponder 50 for redundancy are rearranged to ports with smaller numbers, then an outage occurs, and thus, rearrangement is not performed.

Figure 4:
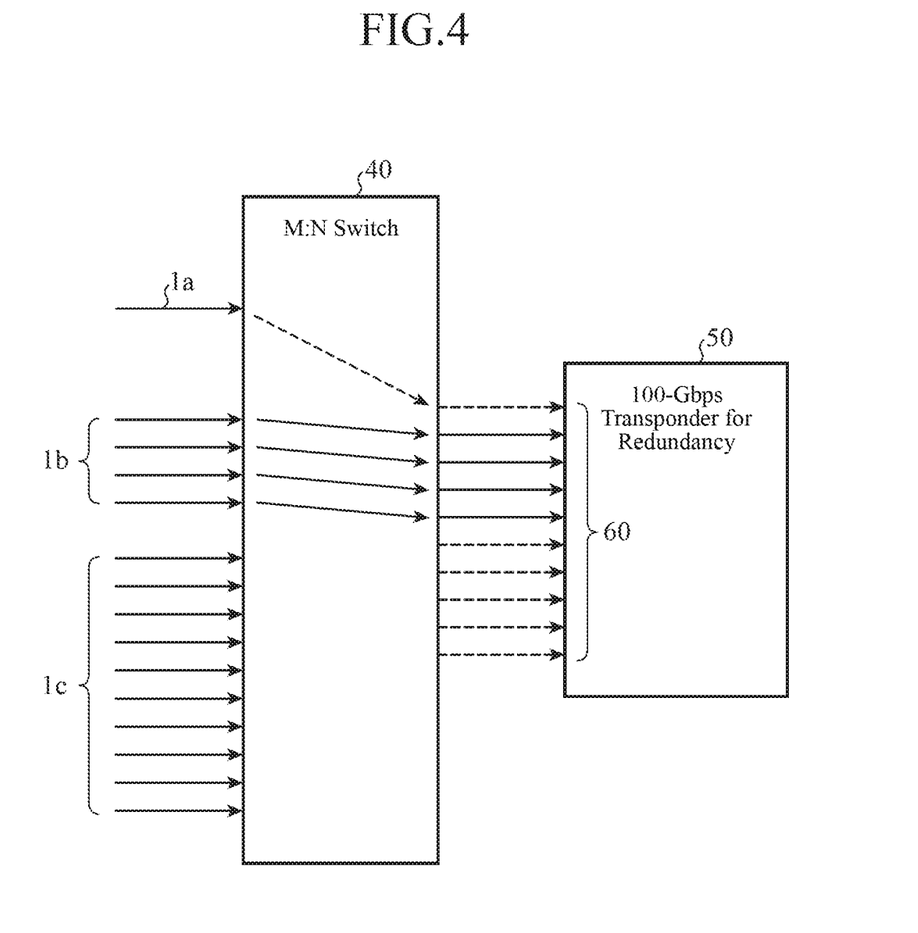
FIG. 4 is a diagram showing the flows of signals 1n the M:N switch of the wavelength redundancy device according to the first embodiment of the invention for when the redundancy of a part of the wavelengths is stopped from a state shown in FIG. 3.

For example, when, as shown in FIG. 3, the client signal 1a occupying the port with the smallest number is brought back to an output from the working system to the line side, a connection from the M:N switch 40 to the port with the smallest number of the 100-Gbps transponder 50 for redundancy is freed up (indicated by a dashed line in FIG. 4), but as shown in FIG. 4, ports to which the client signals 1b are connected are left as they are without change.

Figure 5:
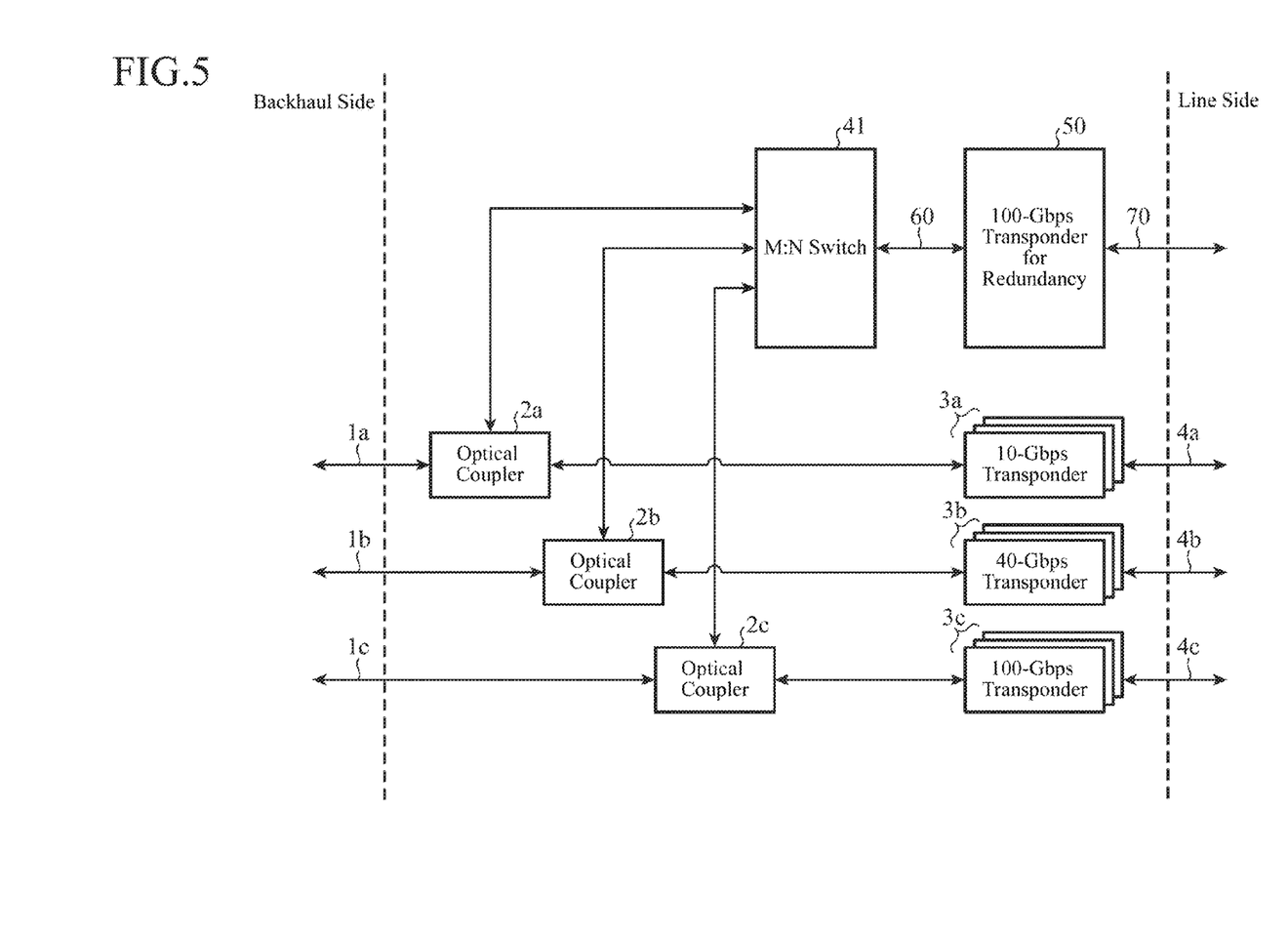
FIG. 5 is a diagram showing a variant of a configuration of a terminal device including a wavelength redundancy device according to the first embodiment of the invention.

In addition, as shown in FIG. 5, a 10-Gbps transponders 3a having different output wavelengths (a is an integer greater than or equal to 1), b 40-Gbps transponders 3b (b is an integer greater than or equal to 1), and c 100-Gbps transponders 3c (c is an integer greater than or equal to 1) can be provided so that the a 10-Gbps transponders 3a can have 1*a 10-Gbps-based client interfaces overall, the b 40-Gbps transponders 3b can have 4*b 10-Gbps-based client interfaces overall, and the c 100-Gbps transponders 3c can have 10*c 10-Gbps-based client interfaces overall.

For client signals 1a in FIG. 5, 1*a client signals 1a in total are transmitted to the a 10-Gbps transponders 3a, respectively. Likewise, for client signals 1b, 4*b client signals 1b in total are transmitted to the b 40-Gbps transponders 3b, respectively. For client signals 1c, 10*c client signals 1c in total are transmitted to the c 100-Gbps transponders 3c, respectively.

An M:N switch 41 is a (1*a+4*b+10*c):10 switch, and selects client signals carried on a wavelength where trouble has occurred, and outputs the selected client signals to a 100-Gbps transponder 50 for redundancy as redundancy client signals 60, by which as with the configuration shown in FIG. 1, a redundancy process is possible.

As such, even when there are a 10-Gbps transponders 3a, b 40-Gbps transponders 3b, and c 100-Gbps transponders 3c, only one 100-Gbps transponder 50 can handle such a case as a transponder for redundancy.

In the case of the configuration shown in FIG. 5, even if, with eight ports out of ten ports of the 100-Gbps transponder 50 for redundancy already occupied, outputs from one of the b 40-Gbps transponders 3b are further attempted to be switched to outputs from the 100-Gbps transponder 50 for redundancy, only two 10-Gbps client signals can be switched. In such a case, redundancy is achieved by setting a priority order in advance for client signals and performing, by a switch controller, control such that the M:N switch 41 selectively outputs client signals according to the priority order.

Note that in FIG. 5 the same or corresponding portions as/to those in other drawings are denoted by the same reference signs and description thereof is omitted or simplified. The same also applies to subsequent drawings.

As described above, according to the first embodiment, even when there are a plurality of types of WDM transmission rates, wavelength redundancy is achieved by the M:N switch 40 or the M:N switch 41 selectively outputting client signals 1a to 1c to be made redundant, to the 100-Gbps transponder 50 for redundancy having client interfaces that conform to the client signals 1a to 1c. Therefore, there is no need to install a wavelength redundancy device on a per WDM transmission rate basis, enabling effective use of a band and a reduction in the cost and installation space required for wavelength redundancy devices.

In addition, the M:N switches 40 and 41 selectively output client signals according to the priorities of the client signals. Thus, important client signals can be securely made redundant.

Note that the M:N switch 40 and the M:N switch 41 are not limited to the above-described 15:10 switch and (1*a+4*b+10*c):10 switch, and may be configured as a K (K is an integer greater than or equal to 2):L (L is an integer greater than or equal to 1) switch, according to the number of client signals 1a to 1c or the configuration status of the terminal device.

Second Embodiment

Figure 6:
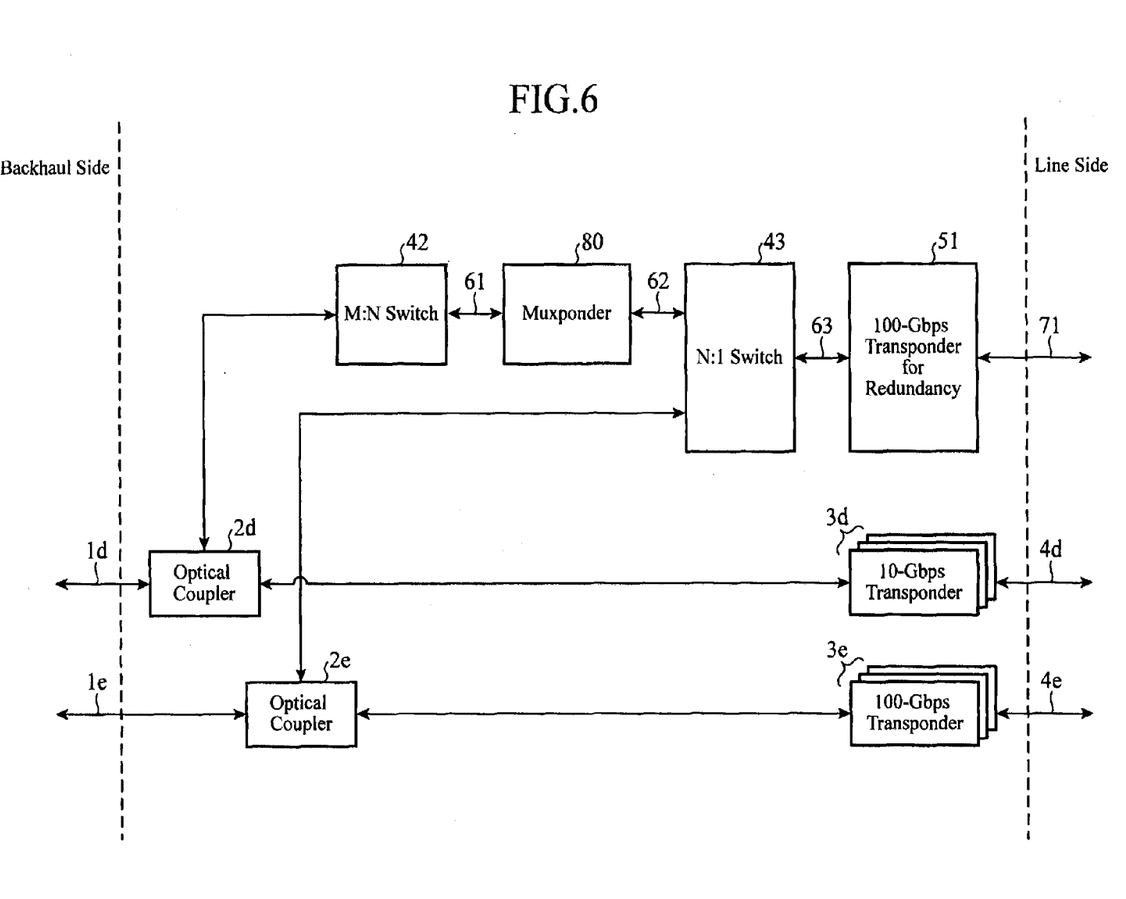
FIG. 6 is a diagram showing a configuration of a terminal device including a wavelength redundancy device according to a second embodiment of the invention.

FIG. 6 shows an exemplary configuration of a terminal device including a wavelength redundancy device according to a second embodiment of the invention.

The first embodiment shows redundancy for a case in which there are different WDM transmission rates and client signals have the same transmission rate; on the other hand, the second embodiment shows redundancy for a case in which there are different WDM transmission rates and there are also a plurality of types of transmission rates of client signals.

The terminal device includes optical couplers 2d and 2e that branch client signals 1d and 1e which are transmitted from a backhaul side; d 10-Gbps transponders 3d (working transponders) (d is an integer greater than or equal to 1) each including one 10-Gbps-based client interface; e 100-Gbps transponders 3e (working transponders) (e is an integer greater than or equal to 1) each including one 100-Gbps-based client interface; an M:N switch 42 and an N:1 switch 43 that selectively output an inputted signal; a muxponder 80 including ten 10-Gbps-based client interfaces; and a 100-Gbps transponder 51 for redundancy including one 100-Gbps-based client interface. Note that FIG. 6 only shows components related to redundancy and omits components that perform processes such as wavelength multiplexing and amplification.

The client signals 1d are 10-Gbps signals and are to be transmitted to the d 10-Gbps transponders 3d, respectively, and 1*d client signals 1d in total are transmitted. The client signals 1e are 100-Gbps signals and are to be transmitted to the e 100-Gbps transponders 3e, respectively, and 1*e client signals 1e in total are transmitted. The client signals 1d are branched by the optical coupler 2d into a direction of the 10-Gbps transponders 3d and a direction of the M:N switch 42. The client signals 1e are branched by the optical coupler 2e into a direction of the 100-Gbps transponders 3e and a direction of the N:1 switch 43.

Of the client signals 1d and 1e which are branched into two directions by the optical couplers 2d and 2e, signals going to the M:N switch 42 or the N:1 switch 43 are branched as redundancy client signals. Note that both of signals going to the M:N switch 42 or the N:1 switch 43 and signals going to the 10-Gbps transponders 3d or the 100-Gbps transponders 3e are substantially the same signals, and thus, description is made such that both signals are referred to as the client signals 1d and 1e.

The d 10-Gbps transponders 3d output the client signals 1d which are inputted thereto, respectively, through the optical coupler 2d, to a line side at different wavelengths $\lambda_{11}$ to $\lambda_{1d}$, as 10-Gbps WDM line signals 4d. In addition, the e 100-Gbps transponders 3e output the client signals 1e which are inputted thereto, respectively, through the optical coupler 2e, to the line side at different wavelengths $E\lambda_3$ to $\lambda_{3e}$, as 100-Gbps WDM line signals 4e.

The M:N switch 42 includes 1*d 10-Gbps-based client interfaces, the number of which is the same as the total number of the client signals 1d, and selectively outputs, as redundancy client signals 61, 10 client signals 1d at the maximum which are inputted through the optical coupler 2d. That is, the M:N switch 42 is a d:10 switch.

The muxponder 80 bundles together and outputs the redundancy client signals 61 inputted from the M:N switch 42, as a 100-Gbps redundancy client signal 62.

The N:1 switch 43 includes 1+1*e 100-Gbps-based client interfaces for the redundancy client signal 62 inputted from the muxponder 80 and for the client signals 1e inputted through the optical coupler 2e. The N:1 switch 43 selectively outputs any of the inputted redundancy client signal 62 and client signals 1e, as a redundancy client signal 63. That is, the N:1 switch 43 is an e+1:1 switch.

The 100-Gbps transponder 51 for redundancy outputs the redundancy client signal 63 which is inputted from the N:1 switch 43 through its client interface, to the line side at a wavelength $\lambda_{41}$, as a 100-Gbps redundancy WDM line signal 71.

Next, the operation of the terminal device configured in the above-described manner will be described.

At normal times, the d 10-Gbps transponders 3d output client signals 1d which are inputted thereto, respectively, through the optical coupler 2d, to the line side at different wavelengths $\lambda_{11}$ to $\lambda_{1d}$, as 10-Gbps WDM line signals 4d. Likewise, the e 100-Gbps transponder 3e output client signals 1e inputted through the optical coupler 2e, to the line side at different wavelengths $\lambda_{31}$ to $\lambda_{3e}$, as 100-Gbps WDM line signals 4e. Then, the WDM line signals are subjected to processes such as wavelength multiplexing and amplification, and outputted to an optical transmission line.

Note that the above-described flow of operation is a flow for when the terminal device shown in FIG. 6 functions as a transmitting side, and when the flow goes backward, the terminal device shown in FIG. 6 functions as a receiving side. A wavelength multiplexing optical transmission system is constructed such that a plurality of terminal devices face each other.

Next, operation performed when trouble has occurred in a wavelength, i.e., a redundancy process, will be described.

For example, it is assumed that some kind of trouble has occurred in paths related to 10 or less wavelengths among the wavelengths $\lambda_{11}$ to $\lambda_{1d}$ of the 10-Gbps WDM line signals 4d which are outputted from the d 10-Gbps transponders 3d, and the occurrence of the trouble is notified to the terminal device.

In response to the notification about the trouble concerning the wavelengths, the 10-Gbps transponders 3d that output the wavelengths where the trouble has occurred stop the client signals 1d inputted through the optical coupler 2d, by a controller (not shown) included therein, using software or hardware.

In addition, in response to the notification about the trouble concerning the wavelengths, switch controllers (not shown) control the switching of the switches of the M:N switch 42 and the N:1 switch 43.

By the control of the switch controllers, the M:N switch 42 selects the client signals 1d that are inputted through the optical coupler 2d and that have been outputted from the 10-Gbps transponders 3d, carried on the wavelengths where the trouble has occurred, and outputs the selected client signals 1d as redundancy client signals 61.

The muxponder 80 bundles together and outputs, as a 100-Gbps redundancy client signal 62, the redundancy client signals 61 (actually, the client signals 1d) which are inputted from the M:N switch 42.

The N:1 switch 43 is controlled by the switch controller to select and output the redundancy client signal 62 inputted from the muxponder 80, as a redundancy client signal 63.

The 100-Gbps transponder 51 for redundancy outputs the redundancy client signal 63 inputted from the N:1 switch 43, to the line side at the wavelength $\lambda_{41}$, as a 100-Gbps redundancy WDM line signal 71. By this, the plurality of (10 or less) wavelengths where the trouble has occurred can be made redundant simultaneously.

Alternatively, for example, it is assumed that some kind of trouble has occurred in a path related to any one of the wavelengths $\lambda_{31}$ to $\lambda_{3e}$ for 100-Gbps outputted from the e 100-Gbps transponders 3e.

In this case, the N:1 switch 43 selects the client signal 1e that is inputted through the optical coupler 2e and that is outputted from the 100-Gbps transponder 3e, carried on the wavelength where the trouble has occurred, and outputs the selected client signal 1e as a redundancy client signal 63.

The 100-Gbps transponder 51 for redundancy outputs the redundancy client signal 63 (actually, the client signal 1e) which is inputted from the N:1 switch 43, to the line side at the wavelength $\lambda_{41}$, as a 100-Gbps redundancy WDM line signal 71. By this, the wavelength $\lambda_{31}$ to $\lambda_{3e}$ where the trouble has occurred can be made redundant.

As such, the d 10-Gbps transponders 3d and the e 100-Gbps transponders 3e function as working system transponders, and the 100-Gbps transponder 51 for redundancy functions as a redundancy system transponder.

The M:N switch 42, the N:1 switch 43, and the muxponder 80 compose a selector/switcher, and the selector/switcher, the optical couplers 2d and 2e, and the 100-Gbps transponder 51 for redundancy compose a wavelength redundancy device. Even if there are different WDM transmission rates such as 10 Gbps and 100 Gbps, it is sufficient to provide only the 100-Gbps transponder 51 for redundancy as a transponder installed for redundancy, and for a band reserved for redundancy, too, it is sufficient to reserve only a band for the 100-Gbps transponder 51 for redundancy. Therefore, effective use of a band is possible over the case of installing a wavelength redundancy device on a per WDM transmission rate basis. In addition, since there is no need to install a wavelength redundancy device on a per WDM transmission rate basis, a reduction in the cost and installation space required for wavelength redundancy devices is possible.

Note that when trouble concerning 11 or more wavelengths has occurred among the wavelengths $\lambda_{11}$ to $\lambda_{1d}$ for 10-Gbps outputted from the d 10-Gbps transponders 3d, or when trouble concerning two or more wavelengths has occurred among the wavelengths $\lambda_{31}$ to $\lambda_{3e}$ for 100-Gbps outputted from the e 100-Gbps transponders 3e, such a case may be handled by, for example, setting in advance the order of client signals 1d or 1e to be made redundant on a priority basis, so that the switch controller can perform control such that the M:N switch 42 or the N:1 switch 43 selectively outputs a client signal according to the priority order.

Figure 7:
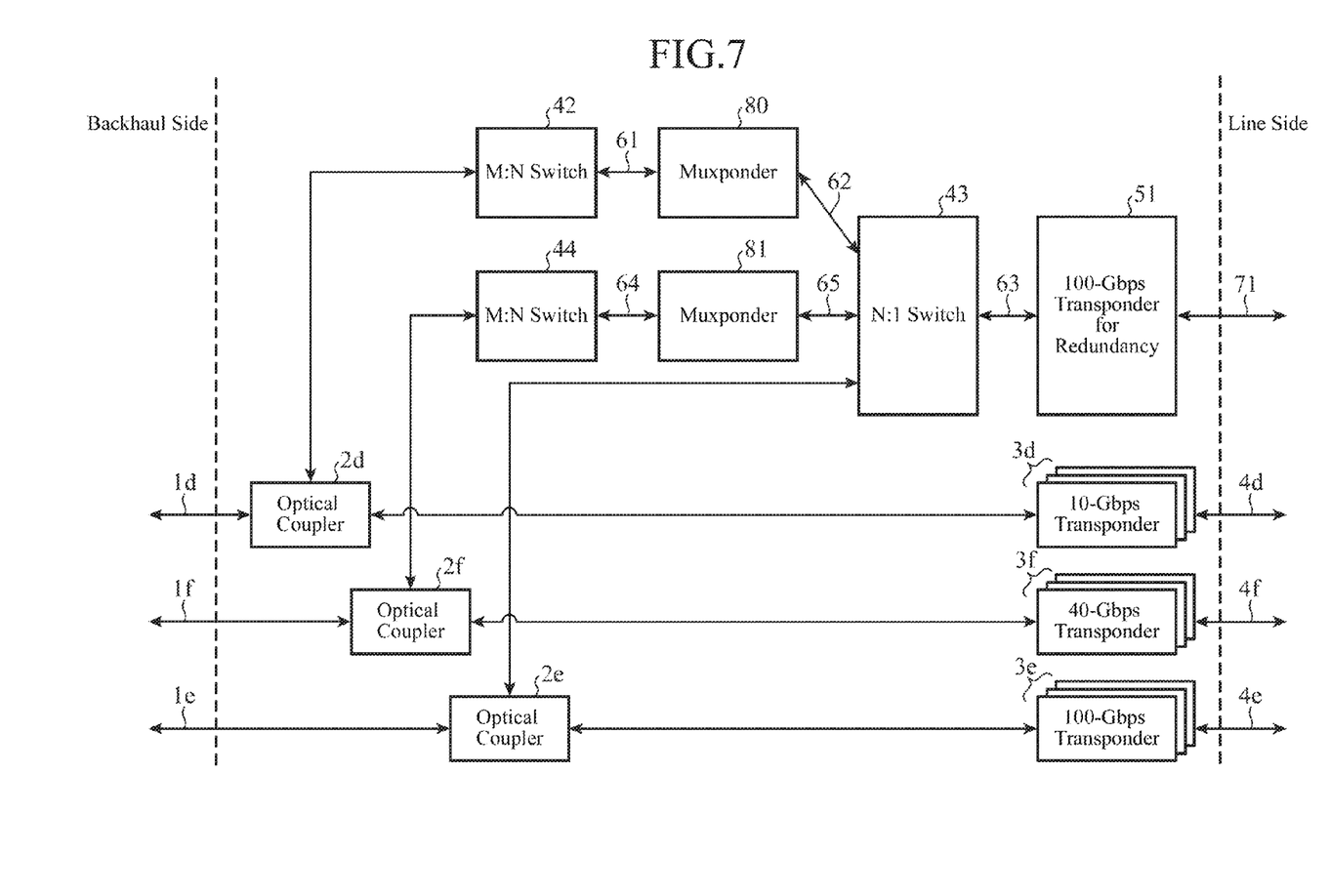
FIG. 7 is a diagram showing a first variant of a configuration of a terminal device including a wavelength redundancy device according to the second embodiment of the invention.
Figure 8:
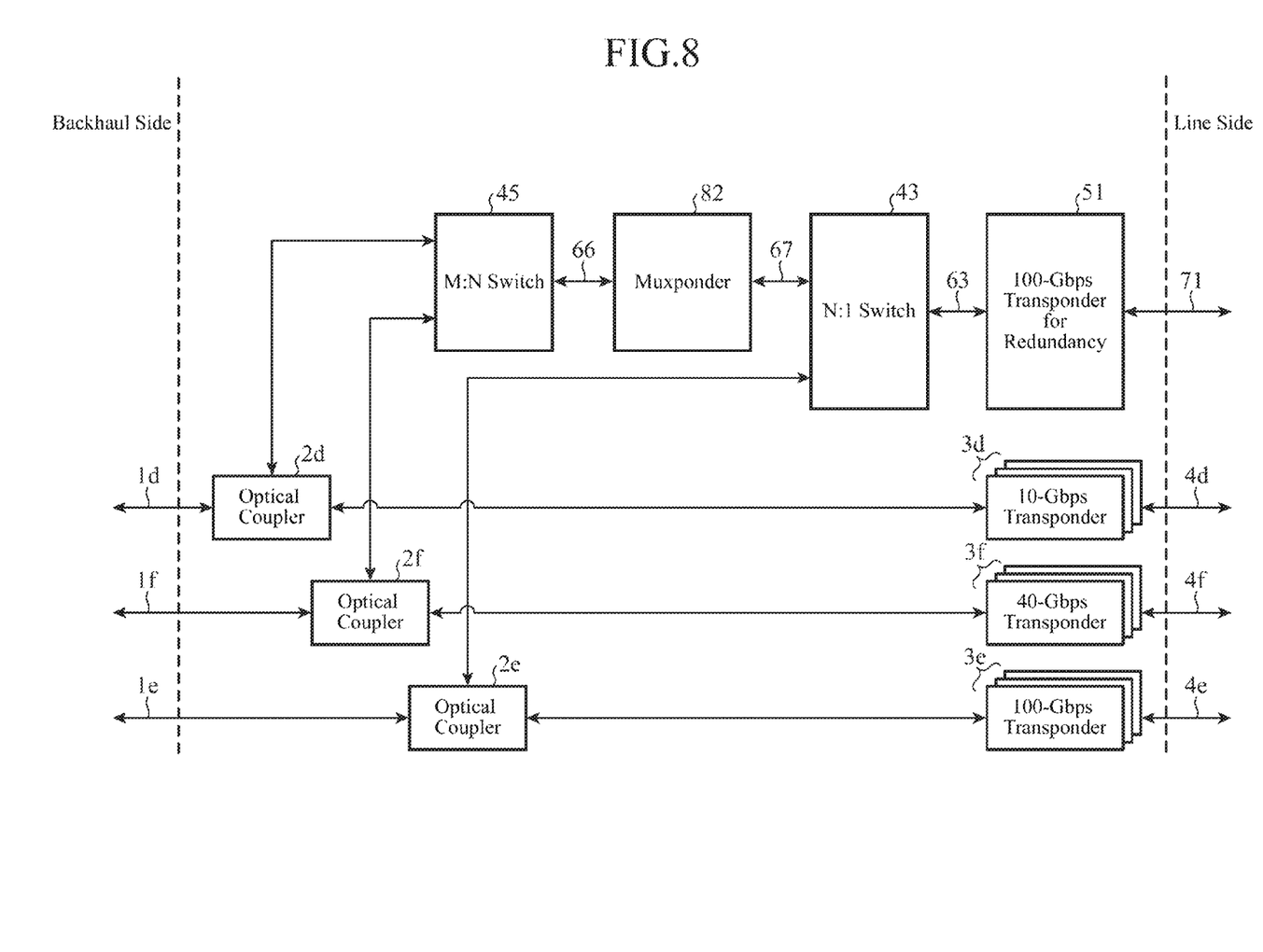
FIG. 8 is a diagram showing a second variant of a configuration of a terminal device including a wavelength redundancy device according to the second embodiment of the invention.

Although FIG. 6 shows the configuration for the case of including the d 10-Gbps transponders 3d to which the 10-Gbps client signals 1d are inputted, respectively, and the e 100-Gbps transponders 3e to which the 100-Gbps client signals 1e are inputted, respectively, FIGS. 7 and 8 show configurations for the case of further including f 40-Gbps transponders 3f (working transponders) (f is an integer greater than or equal to 1) to which 40-Gbps client signals 1f are inputted, respectively. Each of the f 40-Gbps transponders 3f includes one 40-Gbps-based client interface. The f 40-Gbps transponders 3f output the client signals 1f which are inputted thereto, respectively, through an optical coupler 2f, to a line side at different wavelengths $\lambda_{21}$ to $\lambda_{2f}$, as 40-Gbps WDM line signals 4f.

To achieve redundancy in such a configuration, simply, a path is added to the configuration, the path leading from the optical coupler 2f to an M:N switch 44, a muxponder 81, and an N:1 switch 43, which corresponds to a path leading from the optical coupler 2d to the M:N switch 42, the muxponder 80, and the N:1 switch 43 in FIG. 6. This configuration is shown in FIG. 7.

The M:N switch 44 includes 1*f 40-Gbps-based client interfaces, the number of which is the same as the total number of the client signals 1f, and selectively outputs any of the client signals 1f which are inputted through the optical coupler 2f, as redundancy client signals 64.

The muxponder 81 bundles together and outputs the redundancy client signals 64 (actually, the client signals 1f) which are inputted from the M:N switch 44, as a 100-Gbps redundancy client signal 65.

The N:1 switch 43 selectively outputs, as a redundancy client signal 63, any of the redundancy client signal 65 inputted from the muxponder 81 and, in addition thereto, a redundancy client signal 62 inputted from a muxponder 80 and client signals 1e inputted through an optical coupler 2e. Therefore, the N:1 switch 43 in FIG. 7 is an e+2:1 switch including 1+1*e+1 100-Gbps-based client interfaces.

A 100-Gbps transponder 51 for redundancy outputs the redundancy client signal 63 which is inputted from the N:1 switch 43 through its client interface, to the line side at a wavelength 41, as a 100-Gbps redundancy WDM line signal 71.

In FIG. 7, the M:N switches 42 and 44, the N:1 switch 43, and the muxponders 80 and 81 compose a selector/switcher, and the selector/switcher, the optical couplers 2d to 2f, and the 100-Gbps transponder 51 for redundancy compose a wavelength redundancy device.

FIG. 8 shows a different configuration than the above-described configuration of FIG. 7 that is adopted when redundancy is achieved for a configuration including d 10-Gbps transponders 3d to which 10-Gbps client signals 1d are inputted, respectively, e 100-Gbps transponders 3e to which 100-Gbps client signals 1e are inputted, respectively, and f 40-Gbps transponders 3f to which 40-Gbps client signals 1f are inputted, respectively.

An M:N switch 45 includes d+f client interfaces in total, i.e., d client interfaces for the client signals 1d and f client interfaces for the client signals 1f, and selectively outputs two client signals 1d at the maximum which are inputted through an optical coupler 2d and two client signals 1f at the maximum which are inputted through an optical coupler 2f, as redundancy client signals 66.

A muxponder 82 includes two 10-Gbps-based client interfaces and two 40-Gbps-based client interfaces, and bundles together and outputs, as a 100-Gbps redundancy client signal 67, the redundancy client signals 66 (actually, the two client signals 1d at the maximum and the two client signals 1f at the maximum) which are inputted from the M:N switch 42.

The operations of an N:1 switch 43 and a 100-Gbps transponder 51 for redundancy are the same as those described using FIG. 6.

In FIG. 8, the M:N switch 45, the N:1 switch 43, and the muxponder 82 compose a selector/switcher, and the selector/switcher, the optical couplers 2d to 2f, and the 100-Gbps transponder 51 for redundancy compose a wavelength redundancy device.

Figure 9:
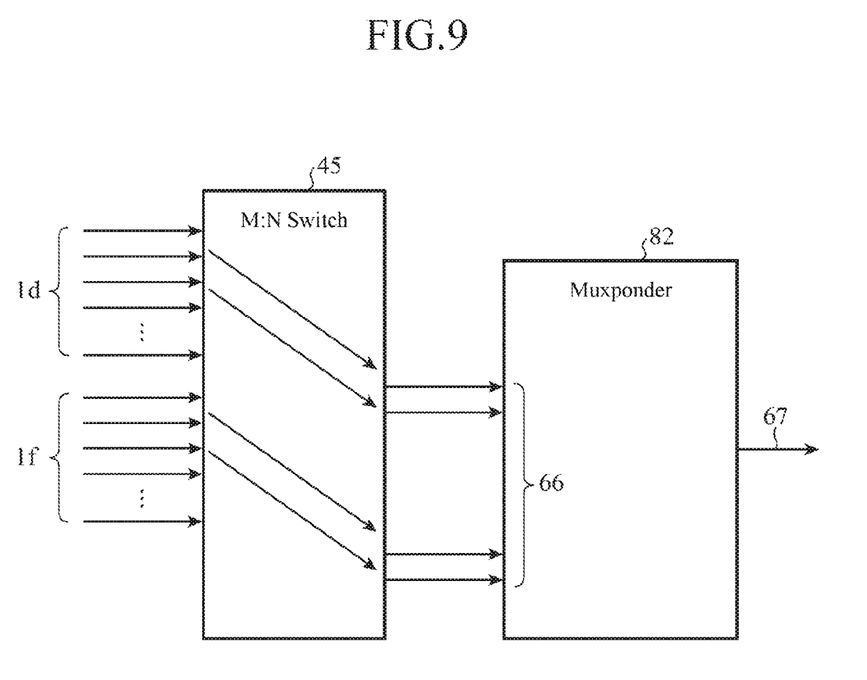
FIG. 9 is a diagram showing the flows of signals 1n an M:N switch of the wavelength redundancy device according to the second embodiment of the invention.

The flows of signals 1n the M:N switch 45 for when a redundancy process is performed are shown in FIG. 9, together with the muxponder 82. The M:N switch 45 selects and outputs, as redundancy client signals 66, two signals at the maximum from each of client signals 1d and 1f inputted through the optical couplers 2d and 2f.

Note that when redundancy client signals 66 are newly outputted to the muxponder 82, the redundancy client signals 66 are connected to ports with the smallest numbers among free ports (client interfaces) of the muxponder 82; on the other hand, as with the case described in FIG. 4, when trouble is solved and signals are brought back again to outputs from a working system to the line side, rearrangement of connections from the M:N switch 45 to the ports of the muxponder 82 is not performed.

Note that as shown in FIG. 8, as long as the transmission rates of signals to be inputted to the muxponder 82 are 100 Gbps or less and the transmission rate of a signal to be outputted from the muxponder 82 can be inputted to a transponder for redundancy (in FIG. 8, can be inputted to a client interface of the 100-Gbps transponder 51 for redundancy), the configuration of the client interfaces of the muxponder 82, such as two 10-Gbps-based client interfaces and two 40-Gbps-based client interfaces, may be changed according to the purpose and used. For example, it is considered to change the configuration of the client interfaces of the muxponder 82 to include six 10-Gbps-based client interfaces and one 40-Gbps-based client interface. In this case, the M:N switch 45 is configured to selectively output, as redundancy client signals 66, six client signals 1d at the maximum which are inputted through the optical coupler 2d and one client signal if at the maximum which is inputted through the optical coupler 2f.

In addition, although FIGS. 6, 7, and 8 show the 100-Gbps transponder 51 for redundancy as a component, instead, for example, a 400-Gbps transponder including four 100-Gbps-based client interfaces may be configured. In this case, instead of the N:1 switch 43, an M:N switch (M:4 switch) is configured. By this, more wavelengths can be made redundant simultaneously. Note that this M:N switch may be configured as a K (K is an integer greater than or equal to 2):L (L is an integer greater than or equal to 1) switch, according to the configuration status of the terminal device.

In addition, the M:N switches 42, 44, and 45 may also be likewise configured as a K (K is an integer greater than or equal to 2):L (L is an integer greater than or equal to 1) switch in addition to the above-described d:10 switch and the like, according to the number of client signals 1d to 1f or the configuration status of the terminal device.

As described above, according to the second embodiment, even when there are a plurality of types of WDM transmission rates, wavelength redundancy is achieved by an M:N switch and an N:1 switch selectively outputting client signals 1d to 1f to be made redundant and by providing a muxponder that converts a signal that does not conform to a client interface of the 100-Gbps transponder 51 for redundancy into a signal with a transmission rate conforming to the client interface. Therefore, there is no need to install a wavelength redundancy device on a per WDM transmission rate basis, enabling effective use of a band and a reduction in the cost and installation space required for wavelength redundancy devices.

In addition, the M:N switch and the N:1 switch selectively output client signals according to the priorities of the client signals. Thus, important client signals can be securely made redundant.

Note that in the invention of the present application, free combination of the embodiments, or modifications to any component of the embodiments, or omission of any component of the embodiments may be made without departing from the spirit and scope of the invention.

In addition, according to the invention, when a current system that has not achieved wavelength redundancy is present, and aside from the current system a system with a higher transmission rate of a WDM line signal is newly constructed, it is possible to collectively achieve redundancy of the system to be newly constructed and the current system that has not achieved wavelength redundancy.

In addition, according to the invention, it is possible to simultaneously protect a plurality of wavelengths within a range in which a transponder used as a redundancy system can accommodate. Therefore, a significant effect is exerted particularly in optical communication through submarine cables where trouble is likely to simultaneously occur in a plurality of wavelengths due to output fluctuations in a repeater, polarization hole burning, and the like.

In addition, although the above describes the configuration in which client signals and WDM line signals have transmission rates of 10 Gbps, 40, Gbps, and 100 Gbps, the transmission rates of client signals and WDM line signals are not limited thereto.

INDUSTRIAL APPLICABILITY

As described above, in a wavelength redundancy device and a wavelength redundancy method according to the invention, there is no need to install a wavelength redundancy device on a per WDM transmission rate basis, enabling effective use of a band and a reduction in the cost and installation space required for wavelength redundancy devices. Thus, the wavelength redundancy device and the wavelength redundancy method are suited to be used for wavelength redundancy in a wavelength multiplexing optical transmission system.

EXPLANATIONS OF REFERENCE NUMERALS

1a to 1f: Client signal, 2a to 2f: Optical coupler, 3a and 3d: 10-Gbps transponder (working transponder), 3b and 3f: 40-Gbps transponder (working transponder), 3c and 3e: 100-Gbps transponder (working transponder), 4a to 4f: WDM line signal, 40 to 42, 44, and 45: M:N switch, 43: N:1 switch, 50 and 51: 100-Gbps transponder for Redundancy, 60 to 67: Redundancy client signal, 70 and 71: Redundancy WDM line signal, and 80 to 82: Muxponder

The invention claimed is:

1. A wavelength redundancy device in a wavelength multiplexing optical transmission system in which WDM (Wavelength Division Multiplex) line signals of different wavelengths are outputted from a plurality of working transponders to process inputted client signals having different types of transmission rates, and there are a plurality of types of transmission rates of the WDM line signals, the wavelength redundancy device comprising:
   optical couplers to output the client signals to the working transponders, and output redundancy client signals into which the client signals are branched;
   a transponder for redundancy, including a client interface, to process a signal inputted through the client interface and output the processed signal as a redundancy WDM line signal;
   a selector/switcher a first M:N switch to selectively output a signal with a transmission rate not conforming to the client interface of the transponder for redundancy, among the redundancy client signals outputted from the optical couplers, where M is an integer greater than or equal to 2 and N is an integer greater than or equal to 1;
   a muxponder to process the redundancy client signal outputted from the first M:N switch and output the processed redundancy client signal as a redundancy client signal with the transmission rate conforming to the client interface of the transponder for redundancy; and
   a second P:Q switch to selectively output, to the transponder for redundancy, the signal outputted from the muxponder, and a signal with a transmission rate conforming to the client interface of the transponder for redundancy, where P is an integer greater than or equal to 2 and Q is an integer greater than or equal to 1, wherein:
   when trouble has occurred in any of the wavelengths of the WDM line signals outputted from the working transponders, the second P:Q switch selects a redundancy client signal corresponding to the client signal inputted to the working transponder to output the WDM line signal of the wavelength where the trouble has occurred, and outputs the selected redundancy client signal as a redundancy client signal with the transmission rate conforming to the client interface of the transponder for redundancy; and
   the transponder for redundancy processes the redundancy client signal outputted from the second P:Q switch, and outputs the processed redundancy client signal as the redundancy WDM line signal.

2. The wavelength redundancy device according to claim 1, wherein the first M:N switch and the second P:Q switch select any of the redundancy client signals outputted from the optical couplers, according to priorities and outputs the selected redundancy client signal.

3. A wavelength redundancy method for a wavelength redundancy device in a wavelength multiplexing optical transmission system in which WDM (Wavelength Division Multiplex) line signals of different wavelengths are outputted from a plurality of working transponders to process inputted client signals having different types of transmission rates, and there are a plurality of types of transmission rates of the WDM line signals, the wavelength redundancy device including:
   optical couplers to output the client signals to the working transponders, and output redundancy client signals into which the client signals are branched;
   a transponder for redundancy, including a client interface, to process a signal inputted through the client interface and output the processed signal as a redundancy WDM line signal;
   a first M:N switch to selectively output a signal with a transmission rate not conforming to the client interface of the transponder for redundancy, among the redundancy client signals outputted from the optical couplers, where M is an integer greater than or equal to 2 and N is an integer greater than or equal to 1;
   a muxponder to process the redundancy client signal outputted from the first M:N switch and output the processed redundancy client signal as a redundancy client signal with the transmission rate conforming to the client interface of the transponder for redundancy; and
   a second P:Q switch to selectively output, to the transponder for redundancy, the signal outputted from the muxponder, and a signal with a transmission rate conforming to the client interface of the transponder for redundancy among the redundancy client signals outputted from the optical couplers, where P is an integer greater than or equal to 2 and Q is an integer greater than or equal to 1, the wavelength redundancy method comprising:
   a signal selection step of selecting, when trouble has occurred in any of the wavelengths of the WDM line signals outputted from the working transponders, a redundancy client signal corresponding to the client signal inputted to the working transponder to output the WDM line signal of the wavelength where the trouble has occurred, the signal selection step being performed by the second P:Q switch;

a first signal outputting step of outputting the redundancy client signal selected in the signal selection step, as a redundancy client signal with the transmission rate conforming to the client interface of the transponder for redundancy, the first signal outputting step being performed by the second P:Q switch; and a second signal outputting step of processing the redundancy client signal outputted in the first signal outputting step, and outputting the processed redundancy client signal as the redundancy WDM line signal, the second signal outputting step being performed by the transponder for redundancy.

* * * * *